(12) United States Patent
Xu et al.

(10) Patent No.: US 8,811,347 B2
(45) Date of Patent: Aug. 19, 2014

(54) METHOD AND APPARATUS FOR SELECTING MME IN WIRELESS COMMUNICATION SYSTEM INCLUDING MOBILE RELAY NODE

(75) Inventors: Jian Xu, Anyang-si (KR); Kyung Min Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 13/524,338

(22) Filed: Jun. 15, 2012

(65) Prior Publication Data

US 2012/0320817 A1 Dec. 20, 2012

Related U.S. Application Data

(60) Provisional application No. 61/497,925, filed on Jun. 16, 2011.

(51) Int. Cl.
| | |
|---|---|
| *H04W 8/08* | (2009.01) |
| *H04L 12/28* | (2006.01) |
| *H04W 92/14* | (2009.01) |
| *H04W 36/00* | (2009.01) |
| *H04W 8/02* | (2009.01) |
| *H04W 88/08* | (2009.01) |

(52) U.S. Cl.
CPC ............... *H04W 8/08* (2013.01); *H04W 92/14* (2013.01); *H04W 36/0011* (2013.01); *H04W 8/02* (2013.01); *H04W 88/085* (2013.01)
USPC .......................................... 370/331; 370/401

(58) Field of Classification Search
None
See application file for complete search history.

(56) References Cited

U.S. PATENT DOCUMENTS

| | | | | |
|---|---|---|---|---|
| 8,059,586 | B2 * | 11/2011 | Bi ................................. | 370/328 |
| 2012/0093081 | A1 * | 4/2012 | Hapsari et al. ................ | 370/328 |
| 2012/0178417 | A1 * | 7/2012 | Hapsari et al. ................ | 455/411 |
| 2012/0250602 | A1 * | 10/2012 | Ou et al. ....................... | 370/315 |
| 2013/0090123 | A1 * | 4/2013 | Gunnarsson et al. ......... | 455/450 |

* cited by examiner

*Primary Examiner* — Eunsook Choi
(74) *Attorney, Agent, or Firm* — Mckenna Long & Aldridge LLP

(57) ABSTRACT

A method and apparatus for selecting a mobility management entity (MME) in a wireless communication system including a mobile relay node is provided. A donor eNodeB (DeNB) receives a mobile relay indicator from the mobile relay node during a radio resource control (RRC) connection establishment procedure, receives a mobile relay support indication from an MME supporting the mobile relay node during an S1 setup procedure between the MME and the DeNB, and selects the MME supporting the mobile relay node among a plurality of MMEs.

14 Claims, 11 Drawing Sheets

FIG. 3
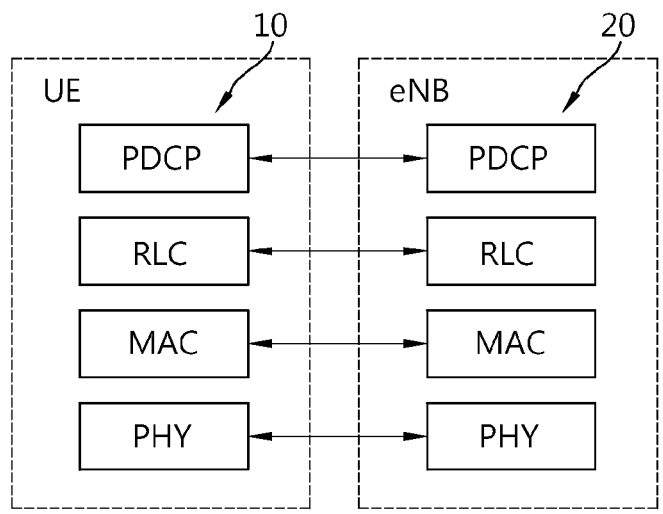
(a)
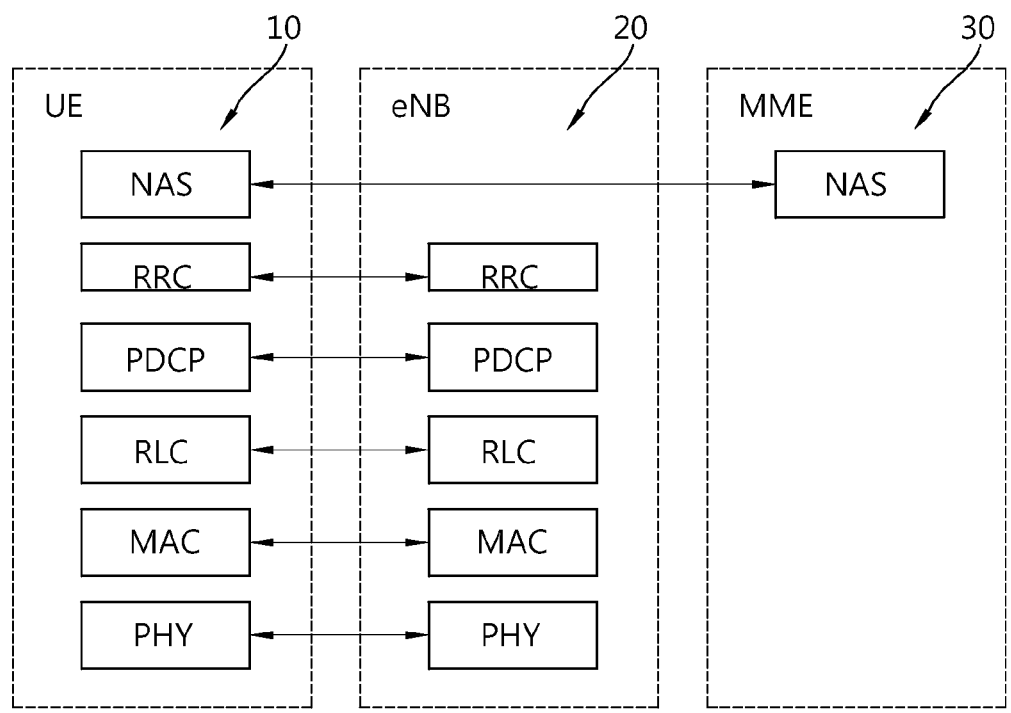
(b)

METHOD AND APPARATUS FOR SELECTING MME IN WIRELESS COMMUNICATION SYSTEM INCLUDING MOBILE RELAY NODE

CROSS-REFERENCE TO RELATED APPLICATIONS

This application claims the benefit of priority of U.S. Provisional application No. 61/497,925 filed on Jun. 16, 2011, which is incorporated by reference.

BACKGROUND OF THE INVENTION

1. Field of the Invention

The present invention relates to wireless communication system, and more particularly, to a method and apparatus for selecting a mobility management entity (MME) in a wireless communication system including a mobile relay node.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS security control, Inter CN node signaling for mobility between 3GPP access networks, Idle mode UE reachability (including control and execution of paging retransmission), tracking area list management (for UE in idle and active mode), PDN GW and serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including per-user based packet filtering (by e.g. deep packet inspection), lawful interception, UE IP address allocation, transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, system architecture evolution (SAE) bearer control, and ciphering and integrity protection of non-access stratum (NAS) signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required.

The PDCP layer of Layer 2 (L2) performs a header compression function that reduces unnecessary control information such that data being transmitted by employing internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, radio bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-RAT cell change order to GERAN with NACC) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and MCS.

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

Meanwhile, 3GPP LTE-A may supports relaying by having a relay node (RN) wirelessly connect to an eNB serving the RN. It may be referred to Paragraph 4.7 of "Technical Specification Group Radio Access Network; Evolved Universal Terrestrial Radio Access (E-UTRA); and Evolved Universal Terrestrial Radio Access Network (E-UTRAN); Overall description; Stage 2 (release 10)" to 3GPP (3rd generation partnership project) TS 36.300 V10.2.0 (2010-12). The eNB serving the RN may be referred as donor eNB (DeNB). The DeNB and the RN may be connected via a modified version of the E-UTRA radio interface. The modified vision may be referred as a Un interface.

The RN may support eNB functionality. It means that the RN terminates the radio protocols of the E-UTRA radio interface, and an S1 and X2 interfaces. In addition to the eNB functionality, the RN may also support a subset of UE functionality, e.g., a physical layer, layer-2, RRC, and NAS functionality, in order to wirelessly connect to the DeNB.

FIG. 5 shows a block diagram illustrating network structure of an LTE-A system introducing a relay system.

Referring to FIG. 5, the LTE-A network includes an E-UTRAN, an EPC and one or more user equipment (not described). The E-UTRAN may include one or more eNB 111, one or more donor eNB (DeNB) 110, one or more relay node (RN) 100 and a plurality of UE may be located in one cell. One or more E-UTRAN MME/S-GW 120 may be positioned at the end of the network and connected to an external network.

As used herein, "downlink" refers to communication from the eNB 111 to the UE, from the DeNB 110 to the UE or from the RN 100 to the UE, and "uplink" refers to communication from the UE to the eNB 111, from the UE to the DeNB 110 or from the UE to the RN 100. The UE refers to communication equipment carried by a user and may be also referred to as a mobile station (MS), a user terminal (UT), a subscriber station (SS) or a wireless device.

The eNB 111 and the DeNB 110 provide end points of a user plane and a control plane to the UE. MME/S-GW 120 provides an end point of a session and mobility management function for UE. The eNB 111 and the MME/S-GW 120 may be connected via an S1 interface. The DeNB 110 and MME/SAE gateway 120 may be connected via an S1 interface. The eNBs 111 may be connected to each other via an X2 interface and neighboring eNBs may have a meshed network structure that has the X2 interface. The eNB 111 and the DeNB 110 may be connected to each other via an X2 interface.

The RN 100 may be wirelessly connected to the DeNB 110 via a modified version of the E-UTRA radio interface being called the Un interface. That is, the RN 100 may be served by the DeNB 110. The RN 100 may support the eNB functionality which means that it terminates the S1 and X2 interfaces. Functionality defined for the eNB 111 or the DeNB 110, e.g. radio network layer (RNL) and transport network layer (TNL), may also apply to RNs 100. In addition to the eNB functionality, the RN 100 may also support a subset of the UE functionality, e.g. physical layer, layer-2, RRC, and NAS functionality, in order to wirelessly connect to the DeNB.

The RN 100 may terminate the S1, X2 and Un interfaces. The DeNB 110 may provide S1 and X2 proxy functionality between the RN 100 and other network nodes (other eNBs, MMEs and S-GWs). The S1 and X2 proxy functionality may include passing UE-dedicated S1 and X2 signaling messages as well as GTP data packets between the S1 and X2 interfaces associated with the RN 100 and the S1 and X2 interfaces associated with other network nodes. Due to the proxy functionality, the DeNB 110 appears as an MME (for S1) and an eNB (for X2) to the RN.

The DeNB 110 may also embed and provides the S-GW/P-GW-like functions needed for the RN operation. This includes creating a session for the RN 100 and managing EPS bearers for the RN 100, as well as terminating the S11 interface towards the MME serving the RN 100.

The RN and the DeNB may also perform mapping of signaling and data packets onto EPS bearers that are setup for the RN. The mapping may be based on existing QoS mechanisms defined for the UE and the P-GW.

The relay node may be classified to a fixed relay node and a mobile relay node. The mobile relay node may be applied to the 3GPP LTE rel-11. One of the possible deployment scenarios of mobile relay node is high speed public transportation, e.g., a high speed railway. That is, the mobile relay node may be put on the top of a high speed train. Hence, it is easily expected that the provision of various good quality services towards the users on a high speed public transportation will be important. Meanwhile, the service requirements offered by the fixed relay node seem to be different from those offered by the mobile relay node. So, there might be a few of considerations that should be resolved in the mobile relay node. The solutions to resolve these considerations for mobile relay node may have impacts on radio a radio access network (RAN).

A S1-flex concept provides support for network redundancy and load sharing of traffic across network elements in a core network (CN), the MME and the S-GW, by creating pools of MMEs and S-GWs and allowing each eNB to be connected to multiple MMEs and S-GWs in a pool. A DeNB supporting the mobile relay node can be connected to multiple MMEs. If the mobile relay node attaches to the DeNB, the DeNB needs to be connected to the MME which supports the mobile relay node. Accordingly, the DeNB needs to know that the relay node trying to attach to the DeNB is the mobile relay node, and whether the MME supports the mobile relay node or not.

A handover procedure may be supported in 3GPP LTE-A. Currently, in RRC_CONNECTED state, the network controls the handover procedure per UE basis. That is, the network decides the movement of each UE toward a new cell. The network triggers the handover procedure based on the radio conditions and load. When the mobile relay node is deployed, it is expected that handover occurs much more frequently, and the excessive signaling overhead will be incurred from per UE based handover. For example, massive UEs served by the mobile relay node may perform the handover procedure at the same time toward the same target eNB (or DeNB) when a high speed train having the mobile relay node stops at the station in the high speed railway scenario. Accordingly, the handover success rate will be reduced due to the excessive signaling overhead and the fact that tracking area update (TAU) is provided in a short period of time. Furthermore, UE measurements in high speed environments are typically less accurate than low speed environments. The UEs on the mobile relay node attached to the high speed public transportation will suffer from the reduced handover success rate. Accordingly, a group mobility handover procedure can be employed. A handover success rate can be improved by per group based handover instead of per UE based handover. When the mobile relay node tries to handover to the target DeNB, the target DeNB needs to be connected to the MME which supports the mobile relay node. Accordingly, the DeNB needs to know that the relay node trying to handover to the target DeNB is the mobile relay node, and whether the MME supports the mobile relay node or not.

Therefore, optimization is needed to resolve the problems.

SUMMARY OF THE INVENTION

The present invention provides a method and apparatus for selecting a mobility management entity (MME) in a wireless communication system including a mobile relay node. The present invention provides a method of receiving an indicator from a mobile relay node and an MME supporting the mobile relay node.

In an aspect, a method for selecting, by a donor eNodeB (DeNB), a mobility management entity (MME) in a wireless communication system including a mobile relay node is provided. The method includes receiving a mobile relay indicator from the mobile relay node during a radio resource control (RRC) connection establishment procedure, receiving a mobile relay support indication from an MME supporting the mobile relay node during an S1 setup procedure between the MME and the DeNB, and selecting the MME supporting the mobile relay node among a plurality of MMEs.

The mobile relay indicator may indicate the mobile relay node is a relay node which is mobile.

The mobile relay support indication may indicate whether the MME supports the mobile relay node or not.

The method may further include performing an S1 setup procedure initiated by the mobile relay node.

The method may further include performing an S1 eNB configuration update procedure with the MME after performing the S1 setup procedure if configuration data for the DeNB is updated.

The method may further include performing an X2 setup procedure initiated by the mobile relay node.

The method may further include performing an X2 eNB configuration update procedure with neighbor eNBs to update cell information after performing an X2 setup procedure.

In another aspect, a donor eNodeB (DeNB) for selecting a mobility management entity (MME) in a wireless communication system including a mobile relay node is provided. The DeNB includes a radio frequency (RF) unit configured for transmitting or receiving a radio signal, and a processor, operatively coupled to the RF unit, and configured for receiving a mobile relay indicator from the mobile relay node during a radio resource control (RRC) connection establishment procedure, receiving a mobile relay support indication from a mobility management entity (MME) supporting the mobile relay node during an S1 setup procedure between the MME and the DeNB, and selecting the MME supporting the mobile relay node among a plurality of MMEs.

BRIEF DESCRIPTION OF THE DRAWINGS

FIG. 3 shows a user-plane protocol and a control-plane protocol stack for the E-UMTS.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
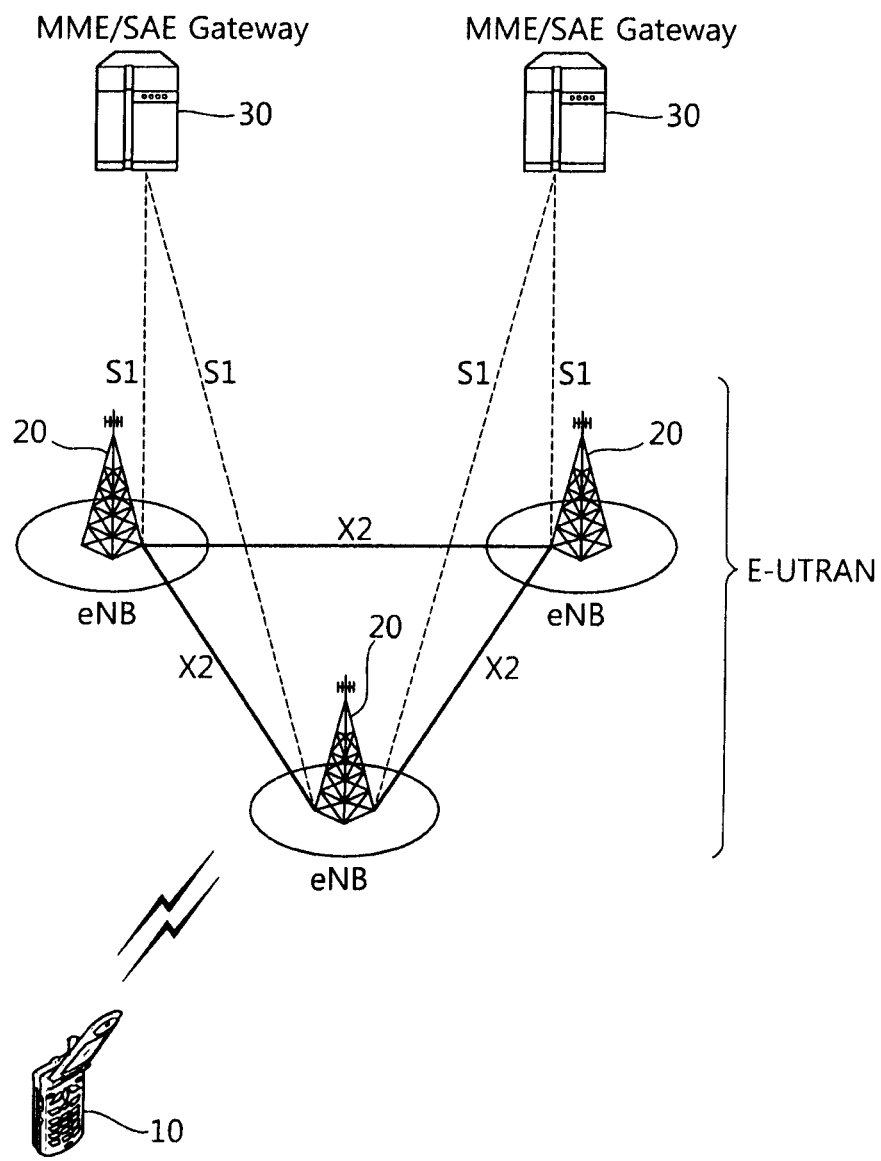
FIG. 1 shows network structure of an evolved universal mobile telecommunication system (E-UMTS).
Figure 2:
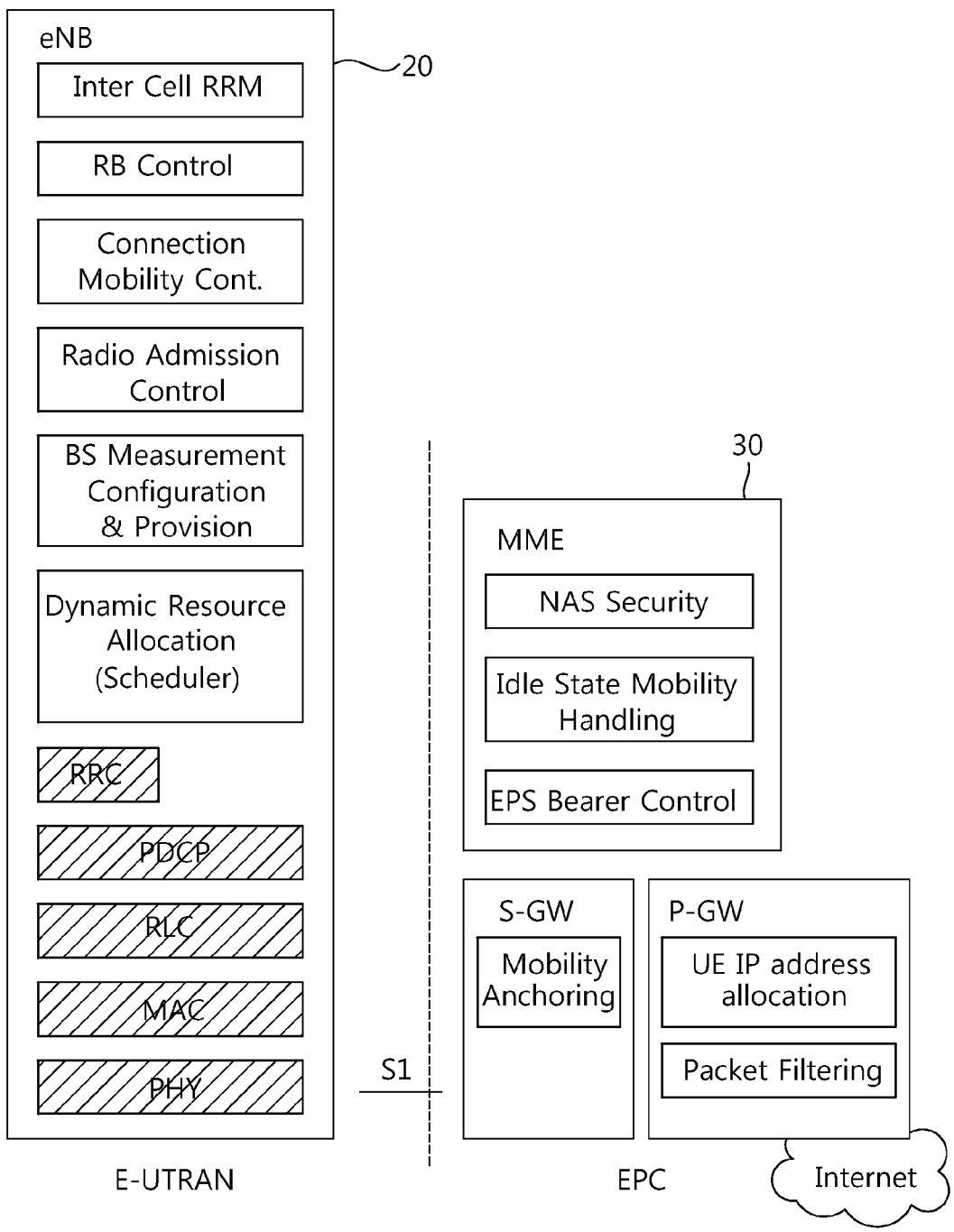
FIG. 2 shows architecture of a typical E-UTRAN and a typical EPC.
Figure 4:
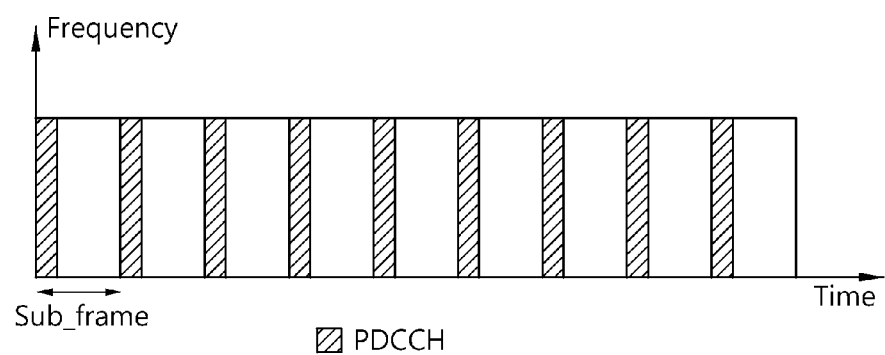
FIG. 4 shows an example of structure of a physical channel.
Figure 5:
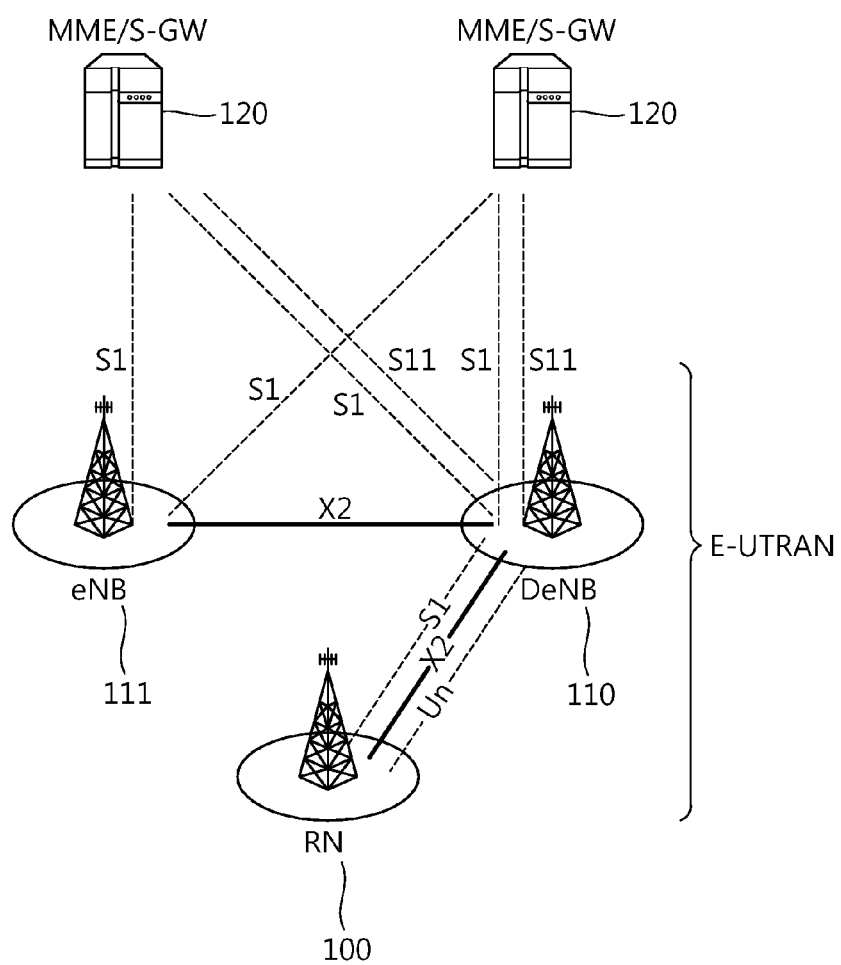
FIG. 5 shows a block diagram illustrating network structure of an LTE-A system introducing a relay system.
Figure 6A:
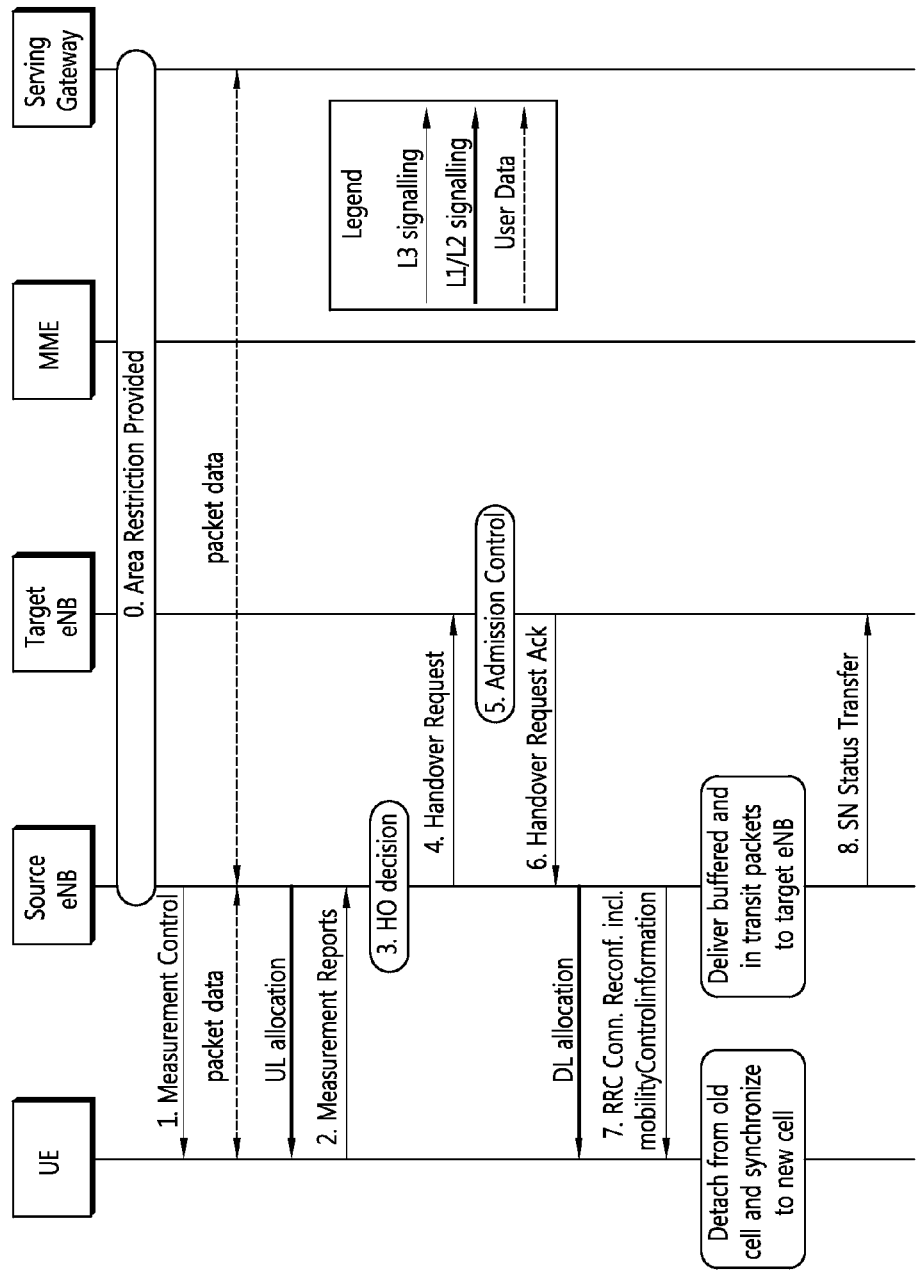
FIG. 6 shows a basic intra-mobile management entity (MME)/serving gateway (S-GW) handover procedure.
Figure 6B:
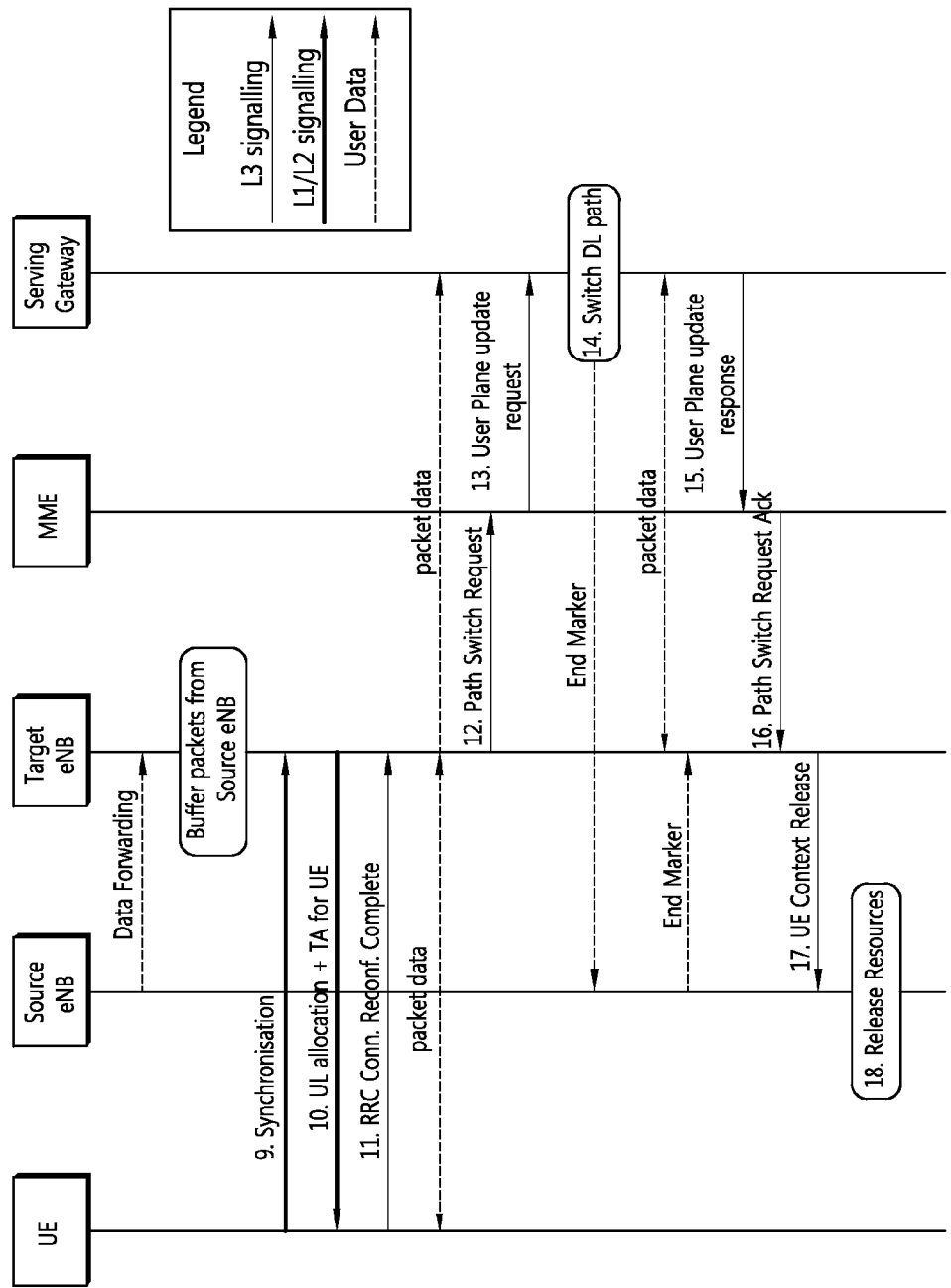

FIG. 6 shows a basic intra-mobile management entity (MME)/serving gateway (S-GW) handover procedure.

In E-UTRAN, network-controlled UE-assisted handovers may be performed in RRC-CONNECTED state. Part of the handover command comes from the target eNB and is transparently forwarded to the UE by the source eNB. To prepare the handover procedure, the source eNB passes all necessary information to the target eNB (e.g. E-RAB attributes and RRC context). When a carrier aggregation (CA) is configured and to enable seconday cell (SCell) selection in the target eNB, the source eNB can provide in decreasing order of radio quality a list of the best cells. Both the source eNB and the UE keep some context (e.g. C-RNTI) to enable the return of the UE in case of handover procedure failure. The UE accesses the target cell via a random access channel (RACH) following a contention-free procedure using a dedicated RACH preamble or following a contention-based procedure if dedicated RACH preambles are not available. If the RACH procedure towards the target cell is not successful within a certain time, the UE initiates radio link failure recovery using the best cell.

The preparation and execution phase of the handover procedure is performed without evolved packet core (EPC) involvement. It means that preparation messages are directly exchanged between the eNBs. The release of the resources at the source side during the handover completion phase is triggered by the eNB. In case an RN is involved, its DeNB relays the appropriate S1 messages between the RN and the MME (S1-based handover) and X2 messages between the RN and target eNB (X2-based handover). The DeNB is explicitly aware of a UE attached to the RN due to the S1 proxy and X2 proxy functionality.

First, the handover preparation procedure is described.

0. Area restriction information is provided. The UE context within the source eNB contains information regarding roaming restrictions which where provided either at connection establishment or at the last timing advance (TA) update.

1. The source eNB configures the UE measurement procedures according to the area restriction information, and transmits a measurement control message to the UE through L3 signaling. Measurements provided by the source eNB may assist the function controlling the UE's connection mobility. Meanwhile, the packet data is exchanged between the UE and the source eNB, or between the source eNB and the serving gateway.

2. The UE transmits measurement reports by the rules set by i.e. system information, specification etc to the source eNB through L3 signaling.

3. The source eNB makes handover decision based on the measurement reports and radio resource management (RRM) information.

4. The source eNB transmits a handover request message through L3 signaling to the target eNB passing necessary information to prepare the handover procedure at the target side. UE X2/UE S1 signaling references enable the target eNB to address the source eNB and the EPC. The evolved radio access bearer (E-RAB) context includes necessary radio network layer (RNL) and transport network layer (TNL) addressing information, and quality of service (QoS) profiles of the E-RABs.

In the case of a UE under an RN performing handover procedure, the handover request message is received by the DeNB, which reads the target cell ID from the message, finds the target eNB corresponding to the target cell ID, and forwards the X2 message toward the target eNB.

In the case of a UE performing handover procedure toward an RN, the handover request is received by the DeNB, which reads the target cell ID from the message, finds the target RN corresponding to the target cell ID, and forwards the X2 message toward the target RN.

5. The target eNB performs admission control. The admission control may be performed dependent on the received E-RAB QoS information to increase the likelihood of a successful handover, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB transmits a handover request acknowledge message to the source eNB through L3 signaling, and prepares the handover. The handover request acknowledge message may include a transparent container to be sent to the UE as an RRC message to perform the handover. The transparent container may include a new C-RNTI, target eNB security algorithm identifiers for the selected security algorithms, a dedicated RACH preamble, and possibly some other parameters i.e. access parameters, SIBs, etc. The handover request acknowledge message may also include RNL/TNL information for the forwarding tunnels, if necessary. Meanwhile, as soon as the source eNB receives the handover request acknowledge message, or as soon as the transmission of the handover command is initiated in the downlink, data forwarding may be initiated.

7. The target eNB transmits an RRC connection reconfiguration message including mobility control information to perform the handover, to be sent by the source eNB to the UE. The source eNB performs the necessary integrity protection and ciphering of the message. The UE receives the RRC connection reconfiguration message with necessary parameters. The UE is commanded by the source eNB to perform the handover procedure. The UE does not need to delay the handover execution for delivering the hybrid automatic repeat request (HARQ)/automatic repeat request (ARQ) responses to the source eNB.

Hereafter, the handover execution procedure will be described.

The UE detaches from old cell and synchronizes to new cell. In addition, the source eNB delivers buffered and in-transit packets to the target eNB.

8. The source eNB transmits a serial number (SN) status transfer message to the target eNB to convey the uplink packet data convergence protocol (PDCP) SN receiver status and the downlink PDCP SN transmitter status of E-RABs for which PDCP status preservation applies. The uplink PDCP SN receiver status may include at least the PDCP SN of the first missing UL SDU and a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRC connection reconfiguration message including the mobility control information, the UE performs synchronization to the target eNB and access the target cell via RACH. The access to the target cell via the RACH may be a contention-free procedure if a dedicated RACH preamble was indicated in the mobility control information. Or, the access to the target cell via RACH may be a contention-based procedure if no dedicated preamble was indicated. The UE derives target eNB specific keys and configures the selected security algorithms to be used in the target cell.

10. The target eNB responds to the synchronization of the UE with UL allocation and timing advance.

11. When the UE has successfully accessed the target cell, the UE transmits an RRC connection reconfiguration complete message (C-RNTI) to confirm the handover procedure, along with an uplink buffer status report, whenever possible, to the target eNB to indicate that the handover procedure is completed for the UE. The target eNB verifies the C-RNTI sent in the RRC connection reconfiguration complete message. The target eNB can now begin transmitting data to the UE. The packet data is exchanged between the UE and the target eNB.

Hereafter, the handover completion procedure will be described.

12. The target eNB transmits a path switch request message to MME to inform that the UE has changed cell.

13. The MME transmits a user plane update request message to a serving gateway (S-GW).

14. The S-GW switches the downlink data path to the target side. The S-GW transmits one or more end marker packets on the old path to the source eNB and then can release any U-plane/TNL resources towards the source eNB.

15. The S-GW transmits a user plane update response message to MME.

16. The MME transmits a path switch acknowledge message to the target eNB to confirm the path switch request message.

17. The target eNB transmits a UE context release message to the source eNB to inform success of the handover procedure and trigger the release of resources by the source eNB.

18. When the UE context release message is received, the source eNB can release radio and C-plane related resources associated to the UE context. Any ongoing data forwarding may continue.

Figure 7:
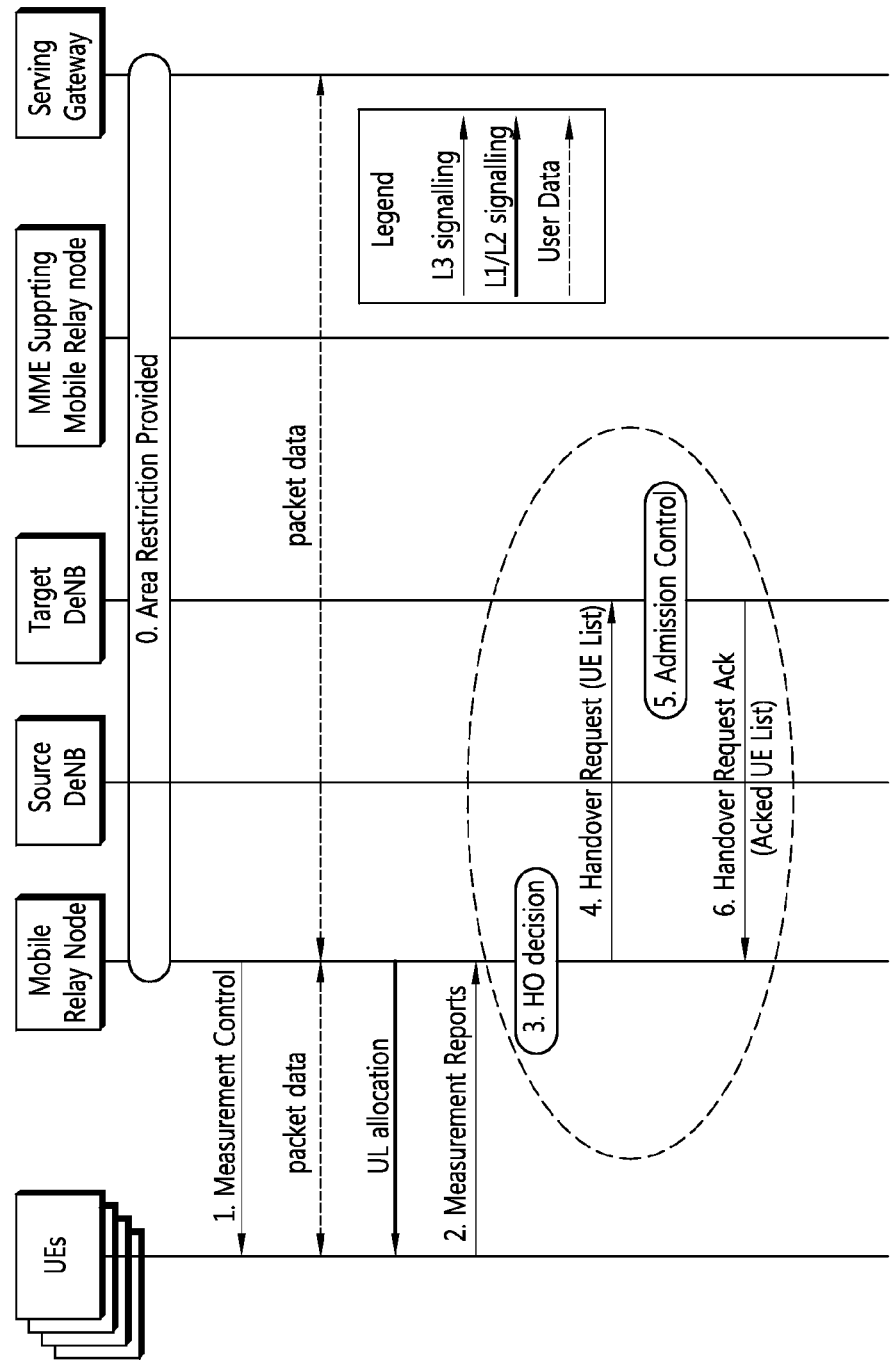
FIG. 7 shows a simplified handover procedure supporting a group mobility.

FIG. 7 shows a simplified handover procedure supporting a group mobility.

The method described in FIG. 7 may be applied when a high speed train stops at a station in a high speed public transportation scenario. The UEs try to handover to the target eNB. The mobile relay forwards a handover request message containing the list of UEs toward the target eNB when it receives the measurement reports from a group of corresponding UEs. That is, during each predefined (subsequent) time period, the handover requests from multiple UEs are grouped into a single handover request for the same target eNB and the grouped handover requests are sent to the respective target eNBs on the time period basis. The number of the grouped handover request may be at least one. That is, a plurality of UEs may be grouped into a single group or a plurality of groups. When a target eNB receives the handover request message, it performs the admission control for the UEs. The target eNB then returns a handover request acknowledge message containing the list of admitted UEs for handover. If the plurality of UEs is grouped into the plurality of groups, the handover request acknowledge message may contain the list of admitted UEs for each group.

0. Area restriction information is provided. The UE context within the source eNB contains information regarding roaming restrictions which where provided either at connection establishment or at the last timing advance (TA) update.

1. The mobile relay node configures the UE measurement procedures, and transmits a measurement control message to the UEs through L3 signaling. Measurements provided by the mobile relay node may assist the function controlling the UE's connection mobility.

2. The UEs transmit measurement reports to the mobile relay node through L3 signaling.

3. The mobile relay node makes handover decision based on RRM information.

4. The mobile relay node transmits a handover request message to the target eNB through L3 signaling to prepare the handover procedure at the target eNB.

When the mobile relay node receives multiple measurements reports from the UEs, the mobile relay node transmits the handover request message containing information on a list of UEs toward the target eNB. As explained before, the handover request message contains the information for multiple UEs for the same target eNB. Also, the grouping of handover requests (e.g., via measurement reports) from multiple UEs into a single handover request message may be done in a predefined time period basis. That is, during each predefined time period, the handover requests from multiple UEs may be grouped into the single handover request message which contains the information on the corresponding UEs. So, the grouped handover request message is transmitted to the same target eNB on a predefined time period basis.

5. After receiving the handover request message from the mobile relay node, the target eNB performs admission control for the UEs contained in the list of UEs in the handover request message.

The admission control may be performed dependent on the received E-RAB QoS information to increase the likelihood of a successful handover, if the resources can be granted by target eNB. The target eNB configures the required resources according to the received E-RAB QoS information and reserves a C-RNTI and optionally a RACH preamble.

6. The target eNB returns a handover request acknowledge message as a response to the handover request message towards the mobile relay node through L3 signaling, and prepares the handover.

When the mobile relay node is employed, an S1-flex problem can be occurred. A DeNB supporting the mobile relay node can be connected to multiple MMEs. If the mobile relay node attaches to the DeNB, the DeNB needs to be connected to the MME which supports the mobile relay node. However, the DeNB does not know that the relay node trying to attach to the DeNB is the mobile relay node, and whether the MME supports the mobile relay node or not. A handover problem can also be occurred. When the mobile relay node tries to handover to the target DeNB, the target DeNB needs to be connected to the MME which supports the mobile relay node. However, the DeNB does not know that the relay node trying to handover to the target DeNB is the mobile relay node, and whether the MME supports the mobile relay node or not. Considering the NAS node selection function of relay node is controlled by the DeNB, it is important to notify the DeNB that it is a mobile relay node, based on which the DeNB can select the MME which supports the group mobility when it takes the responsibility of NAS node selection.

Figure 8:
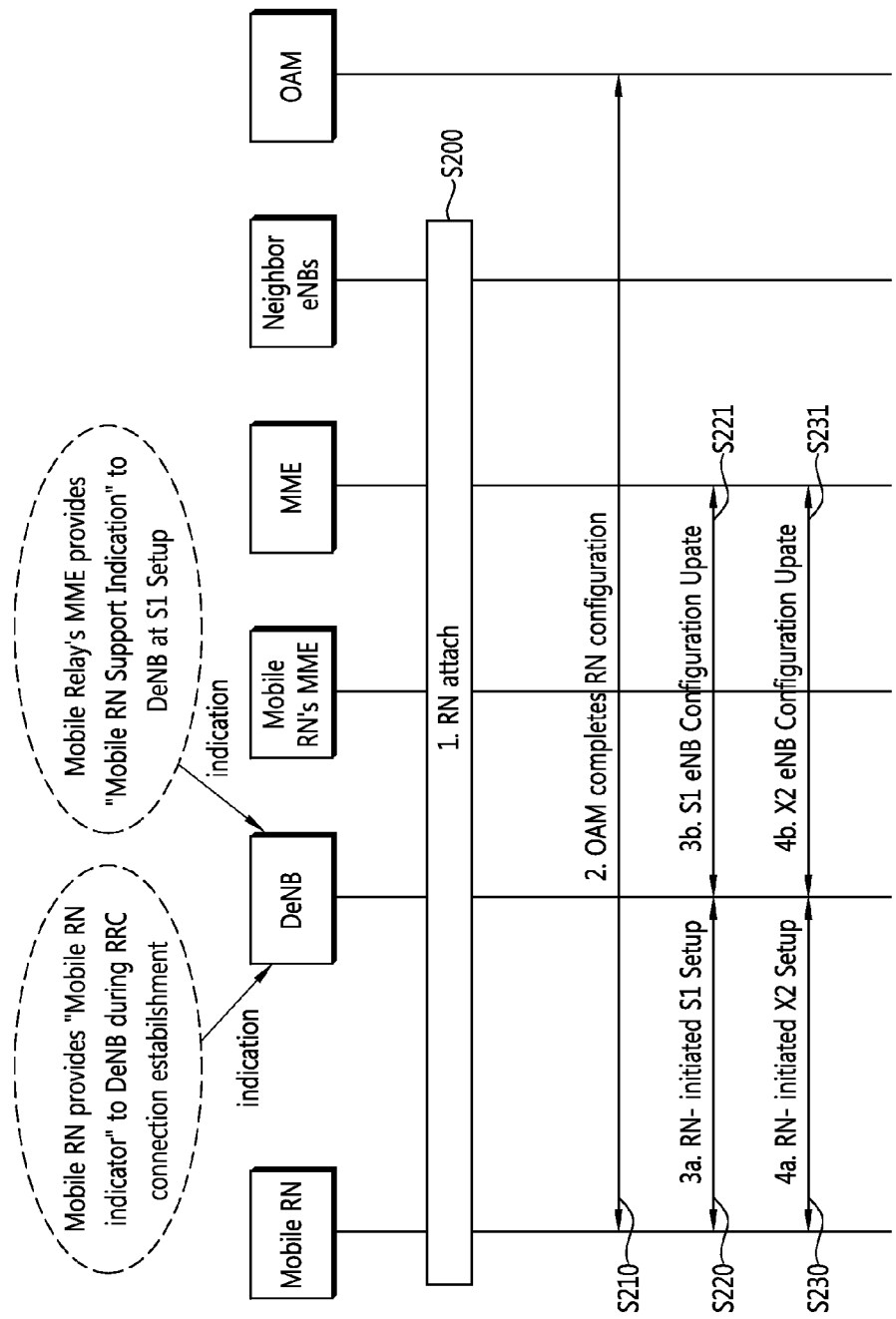
FIG. 8 shows the proposed method according to an embodiment of the present invention.

FIG. 8 shows the proposed method according to an embodiment of the present invention.

In step S200, the relay node attach procedure is performed. In the relay node attach procedure, an RRC connection setup is performed between the mobile relay node and the DeNB. At this time, the mobile relay node transmits a mobile relay node indicator to the DeNB during the RRC connection establishment. The mobile relay node indicator indicates that whether the relay node is a mobile relay node or not. Also, an S1 setup is performed between the DeNB and the MME supporting the mobile relay node. At this time, the MME supporting the mobile relay node transmits a mobile relay node support indication to the DeNB during the S1 setup. The mobile relay node support indication indicates whether the MME supports the mobile relay node or not.

In step S201, an OAM completes the relay node configuration

After the DeNB initiates setup of bearer for S1/X2, the mobile relay node initiates the setup of S1 and X2 associations with the DeNB. In step S220, the mobile relay node initiates the S1 setup. In step S230, the mobile relay node initiates the X2 setup. In addition, the DeNB may initiate an RN reconfiguration procedure via RRC signalling for RN-specific parameters.

After the S1 setup, the DeNB performs the S1 eNB configuration update procedure in step S221, if the configuration data for the DeNB is updated due to the relay node attach procedure. After the X2 setup, the DeNB performs the X2 eNB configuration update procedure to update the cell information in step S231.

Figure 9:
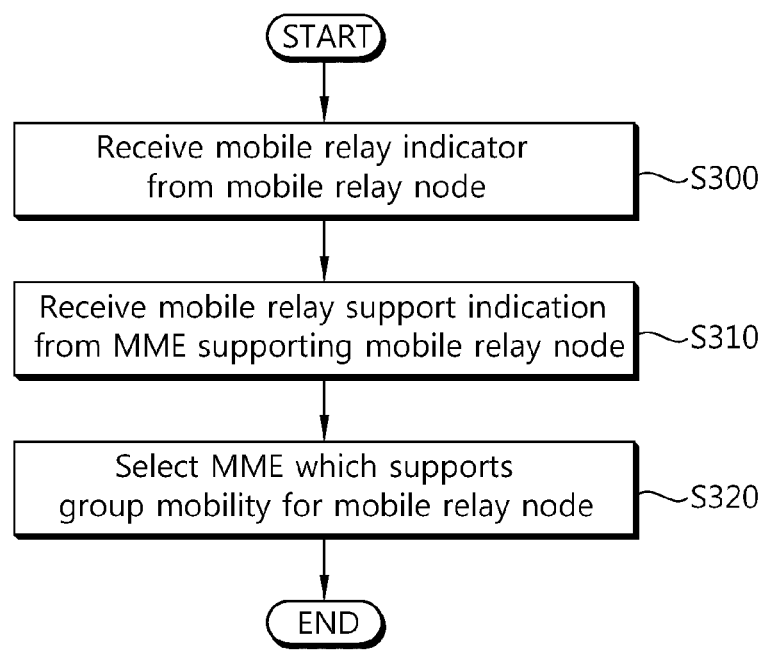
FIG. 9 shows the proposed method according to another embodiment of the present invention.

FIG. 9 shows the proposed method according to another embodiment of the present invention.

In step S300, the DeNB receives a mobile relay node indicator from the mobile relay node during the RRC connection establishment in the relay node attach procedure. The mobile relay node indicator indicates that whether the relay node is a mobile relay node or not. In step S310, the DeNB receives a mobile relay node support indication from the MME supporting the mobile relay node during the S1 setup between the MME and the DeNB in the relay node attach procedure. The mobile relay node support indication indicates whether the MME supports the mobile relay node or not. In step S320, the DeNB selects the proper MME which supports group mobility for the mobile relay node among a plurality of MMEs.

By receiving the indicator from the mobile relay node and the MME supporting the mobile relay node, the DeNB can solve the S1-flex problem, the handover problem, and other problems related to the mobile relay node.

Figure 10:
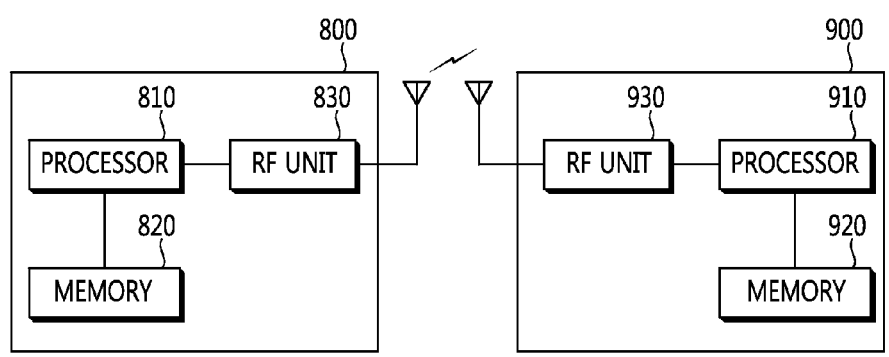
FIG. 10 is a block diagram showing wireless communication system to implement an embodiment of the present invention.

FIG. 10 is a block diagram showing wireless communication system to implement an embodiment of the present invention.

A DeNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A mobile relay node or an MME supporting the mobile relay node 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for selecting, by a donor eNodeB (DeNB), a mobility management entity (MME) in a wireless communication system including a mobile relay node, the method comprising:
    receiving a mobile relay indicator from the mobile relay node during a radio resource control (RRC) connection establishment procedure;
    receiving a mobile relay support indication from an MME supporting the mobile relay node during an S1 setup procedure between the MME and the DeNB; and
    selecting the MME supporting the mobile relay node among a plurality of MMEs.

2. The method of claim 1, wherein the mobile relay indicator indicates the mobile relay node is a relay node which is mobile.

3. The method of claim 1, wherein the mobile relay support indication indicates whether the MME supports the mobile relay node or not.

4. The method of claim 1, further comprising performing an S1 setup procedure initiated by the mobile relay node.

5. The method of claim 4, further comprising performing an S1 eNB configuration update procedure with the MME after performing the S1 setup procedure if configuration data for the DeNB is updated.

6. The method of claim 1, further comprising performing an X2 setup procedure initiated by the mobile relay node.

7. The method of claim 6, further comprising performing an X2 eNB configuration update procedure with neighbor eNBs to update cell information after performing an X2 setup procedure.

8. A donor eNodeB (DeNB) for selecting a mobility management entity (MME) in a wireless communication system including a mobile relay node, the DeNB comprising:
    a radio frequency (RF) unit configured for transmitting or receiving a radio signal; and
    a processor, operatively coupled to the RF unit, and configured for:
    receiving a mobile relay indicator from the mobile relay node during a radio resource control (RRC) connection establishment procedure;
    receiving a mobile relay support indication from a mobility management entity (MME) supporting the mobile relay node during an S1 setup procedure between the MME and the DeNB; and
    selecting the MME supporting the mobile relay node among a plurality of MMEs.

9. The DeNB of claim 8, wherein the mobile relay indicator indicates the mobile relay node is a relay node which is mobile.

10. The DeNB of claim 8, wherein the mobile relay support indication indicates whether the MME supports the mobile relay node or not.

11. The DeNB of claim 8, wherein the processor is further configured for performing an S1 setup procedure initiated by the mobile relay node.

12. The DeNB of claim 11, wherein the processor is further configured for performing an S1 eNB configuration update procedure with the MME after performing the S1 setup procedure if configuration data for the DeNB is updated.

13. The DeNB of claim 8, wherein the processor is further configured for performing an X2 setup procedure initiated by the mobile relay node.

14. The DeNB of claim 13, wherein the processor is further configured for performing an X2 eNB configuration update procedure with neighbor eNBs to update cell information after performing an X2 setup procedure.

* * * * *